United States Patent
Carney et al.

(10) Patent No.: US 10,139,021 B2
(45) Date of Patent: Nov. 27, 2018

(54) PROVISION OF PREDETERMINED FLUID

(71) Applicant: GE Oil & Gas UK Limited, Bristol (GB)

(72) Inventors: Matthew Carney, Hartlepool (GB); Stephen Mills, Newcastle (GB); Leigh Shippen, Newcastle (GB); Michael Kelly, Durham (GB)

(73) Assignee: GE Oil & Gas UK Limited, Bristol (GB)

( * ) Notice: Subject to any disclaimer, the term of this patent is extended or adjusted under 35 U.S.C. 154(b) by 36 days.

(21) Appl. No.: 15/116,020

(22) PCT Filed: Feb. 2, 2015

(86) PCT No.: PCT/GB2015/050259
§ 371 (c)(1),
(2) Date: Aug. 2, 2016

(87) PCT Pub. No.: WO2015/121616
PCT Pub. Date: Aug. 20, 2015

(65) Prior Publication Data
US 2017/0074428 A1    Mar. 16, 2017

(30) Foreign Application Priority Data

Feb. 11, 2014    (GB) .................................. 1402316.2

(51) Int. Cl.
*F16L 11/08*    (2006.01)
*E21B 17/01*    (2006.01)
(Continued)

(52) U.S. Cl.
CPC ............ *F16L 11/083* (2013.01); *E21B 17/01* (2013.01); *E21B 17/18* (2013.01); *F16L 11/12* (2013.01); *F16L 11/22* (2013.01)

(58) Field of Classification Search
CPC .......... F16L 11/083; F16L 11/12; F16L 11/22; E21B 17/01; E21B 17/18
(Continued)

(56) References Cited

U.S. PATENT DOCUMENTS 3,735,475 A * 5/1973 Marriott .................... F16L 9/18
29/455.1
6,039,083 A * 3/2000 Loper ................... F16L 11/083
138/107

(Continued)

FOREIGN PATENT DOCUMENTS

EP         0620104        10/1994
WO    WO 2008/053142     9/2008
(Continued)

OTHER PUBLICATIONS

International Search Report and Written Opinion for International App. No. PCT/GB2015/050259 dated Apr. 7, 2015.
(Continued)

*Primary Examiner* — Eric Keasel
*Assistant Examiner* — David Deal
(74) *Attorney, Agent, or Firm* — Knobbe, Martens, Olson & Bear, LLP (57) ABSTRACT

Apparatus for providing a predetermined fluid in a void space (450) of an annulus (320) of a flexible pipe and a method for providing a predetermined fluid in a void space of an annulus are disclosed. The method comprises introducing a predetermined fluid into at least one fluid communication passageway (120), e.g. an elongated conduit, in an annulus (320) of a flexible pipe and, via the passageway (120), communicating the fluid into a void space (450) of the annulus at a plurality of axially spaced apart locations, e.g.
(Continued)

via a plurality of spaced apart openings in the wall of the elongated conduit, and at a pressure of less than about around 80 psi.

17 Claims, 8 Drawing Sheets

(51) Int. Cl.
   *E21B 17/18*     (2006.01)
   *F16L 11/12*     (2006.01)
   *F16L 11/22*     (2006.01)

(58) Field of Classification Search
   USPC .............................. 138/104, 114, 121, 173
   See application file for complete search history.

(56) References Cited

U.S. PATENT DOCUMENTS

| | | | |
|---|---|---|---|
| 6,085,834 A * | 7/2000 | Thomas | F24F 11/027 165/103 |
| 6,446,672 B1 * | 9/2002 | Kalman | B29D 23/001 138/104 |
| 6,634,388 B1 * | 10/2003 | Taylor | B29C 63/34 138/104 |
| 6,926,039 B2 | 8/2005 | Marion | |
| 8,256,469 B2 | 9/2012 | Felix-Henry | |
| 2003/0056845 A1 * | 3/2003 | Fraser | B29D 23/001 138/127 |
| 2003/0079481 A1 * | 5/2003 | Cooper | B01D 53/26 62/50.7 |
| 2008/0006337 A1 | 1/2008 | Quigley | |
| 2008/0149209 A1 * | 6/2008 | Felix-Henry | F16L 11/083 138/127 |
| 2013/0068464 A1 | 3/2013 | Critsinelis et al. | |

FOREIGN PATENT DOCUMENTS

| | | |
|---|---|---|
| WO | WO 2011/026801 | 3/2011 |
| WO | WO 2011/083819 | 7/2011 |
| WO | WO 2012/092931 | 7/2012 |

OTHER PUBLICATIONS

International Preliminary Report on Patentability for International App. No. PCT/GB2015/050259 dated Apr. 7, 2015.

* cited by examiner

PROVISION OF PREDETERMINED FLUID

The present invention relates to a method and apparatus for providing a predetermined fluid such as a gas, liquid, oil or grease into a void space of an annulus of a flexible pipe. In particular, but not exclusively, the present invention relates to a method by which a fluid can be introduced into a fluid communication passageway that extends along an annulus of a flexible pipe and then used to fill a void space of the annulus relatively rapidly and without requiring an input pressure that might risk damaging one or more layers of the flexible pipe.

Traditionally, flexible pipe has been utilised to transport production fluids, such as oil and/or gas and/or water from one location to another. Flexible pipe has been found to be useful in connecting a subsea location to a sea-level location. Flexible pipe has generally been formed as an assembly of flexible pipe body and one or more end fittings. The pipe body is conventionally formed as a combination of layered materials that form a pressure-containing conduit. The pipe structure allows large deflections in use without causing bending stresses that impair the pipe's functionality over its lifetime. The pipe body is generally built up as a combined structure including tubular metallic and polymer layers which are typically unbonded to one another.

Such unbonded flexible pipes have been used for deep water (less than 3300 feet (1005.84 meters)) and ultra-deep water (greater than 3300 feet (1005.84 meters)) developments. Of course, flexible pipe may also be used for shallow water applications (for example, less than around 500 meters depth) or even for onshore (overland) applications.

Conventionally an inner bore of a flexible pipe is defined by a polymer fluid retaining layer which is often referred to as a pressure sheath. Outside this fluid retaining layer are one or more metallic and/or polymer composite wire layers which between them provide a majority of the pipe structural strength. Outside one or more of these layers there may be a further polymer layer referred to as an intermediate layer and/or an external polymer sealing layer referred to as an outer sheath. The outer sheath typically prevents sea water from contacting the metallic layers. The volume between the pressure sheath and intermediate layer or between an intermediate layer and outer sheath or between the pressure sheath and outer sheath defines an annulus region.

During the service life of a flexible pipe in a pipeline, gases permeate through the various fluid retaining layers and fill one or more annulus regions defined by the various layers. Amongst the many problems this can cause is the fact that these gases can cause an outer sheath of the pipeline to breach or the steel layers to corrode if the annulus is not vented sufficiently. It is known that the collected gases and their concentrations vary depending upon the field where the flexible pipe is deployed and the service of the pipeline. From a corrosion point of view methane, carbon dioxide, hydrogen sulphide, water and/or methanol are all fluids which are of interest. It is advantageous to be able to control the levels of key target gas levels to ensure they stay below a desired level during operation of a flexible pipe. For example, a goal is to control a corrosive gas level to ensure they stay below an upper limit of so-called sweet service as defined in ISO 15156. Generally, any environment with an $H_2S$ partial pressure above 0.05 pounds per square inch absolute (psia) is considered as sour service. Conventionally vent valves in a riser system or other such pipeline system are provided which will open with a differential pressure of 2 bar with the external ambient pressure (3 bar absolute). Under such circumstances, a sour environment in the annulus would be in a worst case anything above 0.1725% $H_2S$ or 1725 parts per million (ppm).

An alternative way of helping to vent or exhaust undesired fluid from a flexible pipe annulus is disclosed in U.S. Pat. No. 8,256,469. This document helps explain how one or more supply lines can be provided to help force permeated gases to flow from the annulus to an external location. However such techniques are unable to provide a flow rate for the introduced fluid of much over 0.5 liters per hour. This makes any clearance procedure time consuming and thus costly. Also undesired fluids can remain for longer than desired. Speeding up the process is not possible because the significant pumping pressures needed would risk rupturing the flexible pipe.

Additionally it has conventionally proved difficult if not impossible to provide sustaining fluids quickly and effectively throughout the annulus of a flexible pipe. Such a sustaining fluid is a fluid which itself provides a hospitable environment in the annulus for a period of time. An inert gas or an inert liquid is an example of a sustaining fluid. Optionally the sustaining fluid can include one or more components often referred to as scavengers that to some extent counteract the undesired effects of permeating gases or resist the invasion of sea water which occurs subsequent to an outer sheath breach. Introducing such fluids into an annulus and maintaining them at a desired level/in sufficient quantity over time has proved difficult.

It is an aim of the present invention to at least partly mitigate the above-mentioned problems.

It is an aim of certain embodiments of the present invention to provide a method and apparatus which enables a predetermined fluid to be provided into a void space of an annulus of a flexible pipe with a flow rate of at least about around 5 liters per minute and at a pressure of less than about around 80 psi.

It is an aim of certain embodiments of the present invention to be able to fill and/or purge an annulus of a flexible pipe to entirely or more or less entirely remove undesired fluids either as a one off process or repeatedly as desired.

It is an aim of certain embodiments of the present invention to provide a sustaining fluid such as an inert fluid into an annulus of a flexible pipe.

It is an aim of certain embodiments of the present invention to provide a flexible pipe having one or more annulus regions which can be selectively filled and emptied in a relatively quick time without risk of causing undesired damage to one or more layers of the flexible pipe.

According to a first aspect of the present invention there is provided a method for providing a predetermined fluid in a void space of an annulus of a flexible pipe, comprising the steps of:
  introducing a predetermined fluid into at least one fluid communication passageway in an annulus of a flexible pipe; and
  via the passageway, communicating the fluid into a void space of the annulus at a plurality of axially spaced apart locations and at a pressure of less than about around 80 psi.

Aptly the method further comprises substantially filling the void space with predetermined fluid.

Aptly the method further comprises communicating fluid to said plurality of locations substantially simultaneously.

Aptly the method further comprises providing said predetermined fluid at a flow rate of at least about around 5 liters per minute and optionally at least about around 15 liters per minute and optionally at least about around 25 liters per minute.

Aptly the positive pressure is less than about around 50 psi.

Aptly the positive pressure is less than about around 40 psi.

Aptly the method further comprises filling the void space with fluid at locations spaced apart along substantially a whole length of the flexible pipe.

Aptly the step of introducing a fluid into a fluid communication passageway comprises selectively providing the predetermined fluid from a fluid source to an inlet at an end of an elongate conduit that extends from a first end of the flexible pipe along the annulus and in fluid communication with the annulus void space; and the step of communicating fluid comprises providing predetermined fluid from the inlet to the void space via a plurality of openings in a wall of the conduit at respective positions corresponding to said spaced apart locations.

Aptly the method further comprises providing the predetermined fluid via openings in the conduit wall that provide a reducing open area at respective positions towards said end of the flexible pipe.

Aptly the step of introducing a predetermined fluid comprises:

providing water or a grease or an oil, optionally dosed with at least one of an oxygen scavenger and/or a $H_2S$ scavenger and/or a PH buffer and/or a biocide into the fluid communication passageway.

Aptly the method further comprises urging fluid from the void space via at least one outlet, in communication with the annulus, disposed at a respective end of the flexible pipe.

Aptly the method further comprises urging fluid from the void space by communicating the predetermined fluid into the void space at the spaced apart locations subsequent to the void space being substantially filled with predetermined fluid.

Aptly the method further comprises urging fluid from the void space by substantially filling the void space with predetermined fluid introduced via the fluid communication passageway using a positive pressure and subsequently providing a negative pressure to the same fluid communication passageway thereby extracting fluid via the fluid communication passageway.

Aptly the method further comprises urging fluid from the void space by communicating fluid to the void space via said fluid communication passageway and removing fluid via at least one further fluid communication passageway that extends along the annulus and is in fluid communication with the annulus void space.

Aptly the method further comprises repeatedly communicating fluid to a void space in an annulus of a flexible pipe and urging fluid from the void space during an operational period associated with use of the flexible pipe.

Aptly the step of urging fluid from the void space comprises urging the predetermined fluid together with previously permeated gas and chemical reactants from the annulus.

Aptly the method further comprises leaving the predetermined fluid as a sustaining fluid in the void space for a predetermined period of time.

According to a second aspect of the present invention there is provided a method for removing undesired fluid from an annulus of a flexible pipe, comprising the steps of:

providing a purge fluid at a positive pressure at an end region of an annulus of a flexible pipe subsequent to a void space in the annulus being substantially pre-filled with filler liquid or filler fluid.

Aptly the method further comprises, via the purge fluid, urging fluid from the annulus at at least one end region of the annulus.

According to a third aspect of the present invention there is provided a flexible pipe, comprising:

an inner fluid retaining layer and an outer fluid retaining layer spaced apart to provide an annulus therebetween; and at least one conduit extending along the annulus from a fluid introduction end of the flexible pipe; wherein said at least one conduit comprises a plurality of openings disposed at respective positions along the annulus for communicating fluid introduced at an end of the conduit into a void space of the annulus at a plurality of axially spaced apart locations and at a flow rate of at least about around 5 liters per minute and at a pressure of less than about around 80 psi.

Aptly the at least one conduit comprises one or more conduits that each extend between a first and second end fitting at respective ends of the flexible pipe.

Aptly each of said one or more conduits comprises a plurality of openings in a wall of the conduit.

Aptly an open area provided by the openings of each conduit decreases towards at least one end of the flexible pipe.

Aptly the flexible pipe comprises a first end fitting at the fluid introduction end of the flexible pipe and said first end fitting comprises at least one fluid introduction port to receive a predetermined fluid from a fluid source.

Aptly the flexible pipe further comprises a fluid communication passageway that extends within the first end fitting connecting said introduction port to an end of said at least one conduit.

Aptly the first end fitting comprises at least one first end fluid outlet in fluid communication with the void space of the annulus.

Aptly the flexible pipe further comprises a further end fitting at a remaining end of the flexible pipe, said further end fitting comprising at least one further end outlet in fluid communication with the void space of the annulus Aptly the flexible pipe further comprises at least one connecting conduit that extends along a length of the annulus between end fittings of the flexible pipe to provide a sealed fluid communication passageway between respective ends of each said at least one conduit.

Aptly the at least one conduit comprises a plurality of conduits that each extend from a common end of the flexible pipe and terminate with an open end at different lengths along the annulus.

According to a fourth aspect of the present invention there is provided apparatus for providing a predetermined fluid in a void space of an annulus of a flexible pipe comprising:

an inner fluid retaining layer and an outer fluid retaining layer spaced apart to provide an annulus therebetween; and at least one conduit extending along the annulus from a fluid introduction end of the flexible pipe; wherein said at least one conduit comprises a plurality of openings disposed at respective positions along the annulus for communicating fluid introduced at an end of the conduit into a void space of the annulus at a plurality of axially spaced apart locations and at a flow rate of at least about around 5 liters per minute and at a pressure of less than about around 80 psi;

a source of a predetermined fluid; and a positive pressure source for introducing the predetermined fluid into the annulus of the flexible pipe via said at least one conduit and at a pressure of less than about around 80 psi.

Aptly the apparatus further comprises a negative pressure pump for removing fluid from the annulus of the flexible pipe via said at least one conduit.

According to a fifth aspect of the present invention there is provided a method substantially as hereinbefore described with reference to the accompany drawings.

According to a sixth aspect of the present invention there is provided apparatus constructed and arranged substantially as hereinbefore described with reference to the accompanying drawings.

Certain embodiments of the present invention provide a method and apparatus for providing a predetermined fluid in a void space of an annulus of a flexible pipe. The predetermined fluid can be introduced at a relatively low pressure of less than about around 80 psi which means there is little or no risk of rupture of the flexible pipe outer sheath whilst the fluid is introduced.

Certain embodiments of the present invention provide a method and apparatus for providing a predetermined fluid in a void space of an annulus at a flow rate of at least about around 5 liters per minute. This means that a void space in the annulus can be filled entirely or at least substantially in a relatively quick time.

Certain embodiments of the present invention provide a method and apparatus for urging fluid from a void space of an annulus of a flexible pipe. By urging fluid from the void space any undesired fluid in the annulus can be removed from the annulus. Removal can occur as part of a one off process or repeatedly or constantly.

Certain embodiments of the present invention provide a method and apparatus which utilises common parts to both selectively fill an annulus and/or purge an annulus. This helps reduce the complexity of the flexible pipe and thus the manufacturing costs.

Certain embodiments of the present invention will now be described hereinafter, by way of example only, with reference to the accompanying drawings in which.

In the drawings like reference numerals refer to like parts.

Figure 1:
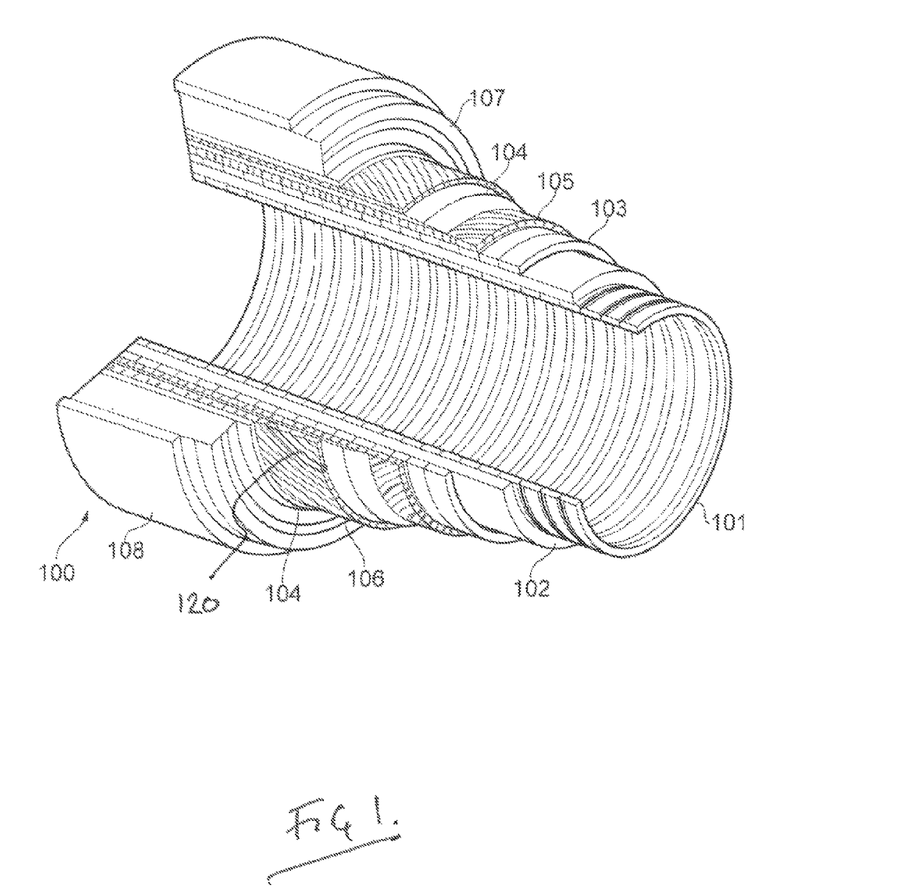
FIG. 1 illustrates flexible pipe body.

Throughout this description, reference will be made to a flexible pipe. It will be understood that a flexible pipe is an assembly of a portion of pipe body and one or more end fittings in each of which a respective end of the pipe body is terminated. FIG. 1 illustrates how a portion of pipe body 100 (referred to as a segment) is formed from a combination of layered materials that form a pressure-containing conduit. Although a number of particular layers are illustrated in FIG. 1, it is to be understood that the present invention is broadly applicable to co-axial pipe body structures including one or more layers manufactured from a variety of possible materials. For example, the pipe body may be formed from metallic layers, composite layers, or a combination of different materials. It is to be further noted that the layer thicknesses are shown for illustrative purposes only.

As illustrated in FIG. 1, pipe body includes an optional innermost carcass layer 101. The carcass provides an interlocked construction that can be used as the innermost layer to prevent, totally or partially, collapse of an internal pressure sheath 102 due to pipe decompression, external pressure, and/or tensile armour pressure and mechanical crushing loads. The carcass layer may be a metallic layer, formed from carbon steel or the like, for example. The carcass layer may also be formed from composite, polymer, or other material, or a combination of materials. It will be appreciated that certain embodiments of the present invention are applicable to 'smooth bore' operations (i.e. without a carcass) as well as such 'rough bore' applications (with a carcass).

The internal pressure sheath 102 acts as a fluid retaining layer and comprises a polymer layer that ensures internal fluid integrity. It is to be understood that this layer may itself comprise a number of sub-layers. It will be appreciated that when the optional carcass layer is utilised the internal pressure sheath may be referred to by those skilled in the art as a barrier layer. In operation without such a carcass the internal pressure sheath may be referred to as a liner.

The pressure armour layer 103 is a structural layer comprising elements having a lay angle close to 90° that increases the resistance of the flexible pipe to internal and external pressure and mechanical crushing loads. The layer also structurally supports the internal pressure sheath, and is an interlocked construction of wires wound with a lay angle close to 90°.

The flexible pipe body also includes a first tensile armour layer 105 and second tensile armour layer 106. Each tensile armour layer is used to sustain tensile loads and internal pressure. The tensile armour layer may be formed from a plurality of metallic wires (to impart strength to the layer) that are located over an inner layer and are helically wound along the length of the pipe at a lay angle typically between about 10° to 55°. The tensile armour layers may be counter-wound in pairs. The tensile armour layers may be metallic layers, formed from carbon steel, for example. The tensile armour layers may also be formed from composite, polymer, or other material, or a combination of materials.

The flexible pipe body shown also includes optional layers 104 of tape which each help contain underlying layers and may act as a sacrificial wear layer to help prevent abrasion between adjacent layers.

The flexible pipe body also includes optional layers of insulation 107 and an outer sheath 108, which comprises a polymer layer used to help protect the pipe against penetration of seawater and other external environments, corrosion, abrasion and mechanical damage.

Each flexible pipe thus comprises at least one segment of pipe body 100 together with an end fitting located at at least one end of the flexible pipe. An end fitting provides a mechanical device which forms the transition between the flexible pipe body and a connector. The different pipe layers as shown, for example, in FIG. 1, are terminated in the end fitting in such a way as to transfer the load between the flexible pipe and the connector.

FIG. 1 also helps illustrate one or more conduits 120 wound in place of a tensile armour winding so as to provide a fluid communication passageway that extends along the flexible pipe body. It will be appreciated that such conduits (described in more detail below) may optionally extend along a full length of the flexible pipe body, being connected into both respective end fittings, or may extend from only one selected end fitting and terminate in an open end or sealed end at a desired length along the flexible pipe body. In the case of a conduit having a sealed end one or more openings in a wall of the conduit near the end as described in more detail below. Such conduits may have the same or different lengths. It will likewise be appreciated that whilst the fluid communication passageway 120 illustrated in FIG. 1 is shown as an outermost tensile armour winding fluid communication passageways could additionally or alternatively be provided by an innermost tensile armour winding or indeed by a winding in another wound layer and/or a combination of these options.

Figure 2:
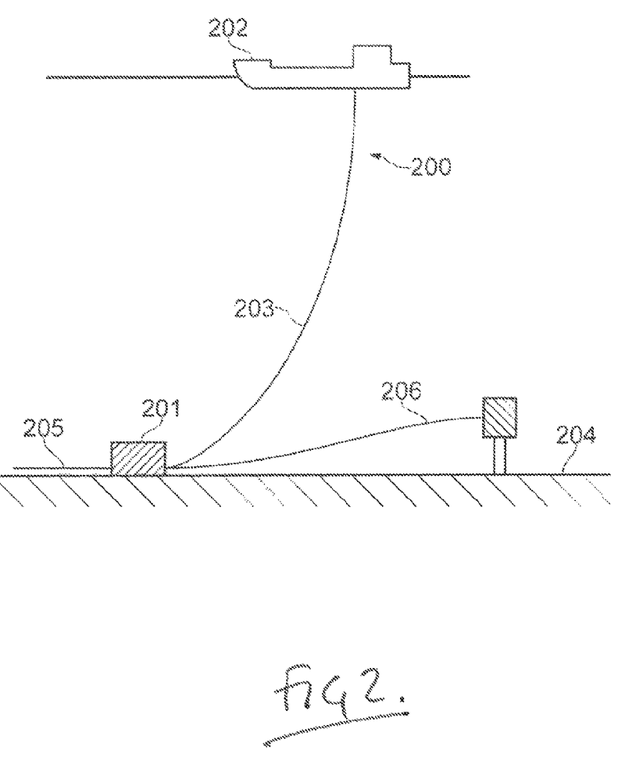
FIG. 2 illustrates use of a flexible pipe.

FIG. 2 illustrates a riser assembly 200 suitable for transporting production fluids such as oil and/or gas and/or water from a subsea location 201 to a floating facility 202. For example, in FIG. 2 the subsea location 201 includes an end of a subsea flow line. The flexible flow line 205 comprises a flexible pipe, wholly or in part, resting on the sea floor 204 or buried below the sea floor and used in a static application. The floating facility may be provided by a platform and/or buoy or, as illustrated in FIG. 2, a ship. The riser assembly 200 is provided as a flexible riser, that is to say a flexible pipe 203 connecting the ship to the sea floor installation. The flexible pipeline may be formed from a single segment or multiple segments of flexible pipe body with end fittings connected end-to-end.

It will be appreciated that there are different types of riser, as is well-known by those skilled in the art. Certain embodiments of the present invention may be used with any type of riser, such as a freely suspended riser (free, catenary riser), a riser restrained to some extent (buoys, chains) or totally restrained riser. Certain other embodiments of the present invention can be used as flowlines or jumpers or the like.

Figure 3:
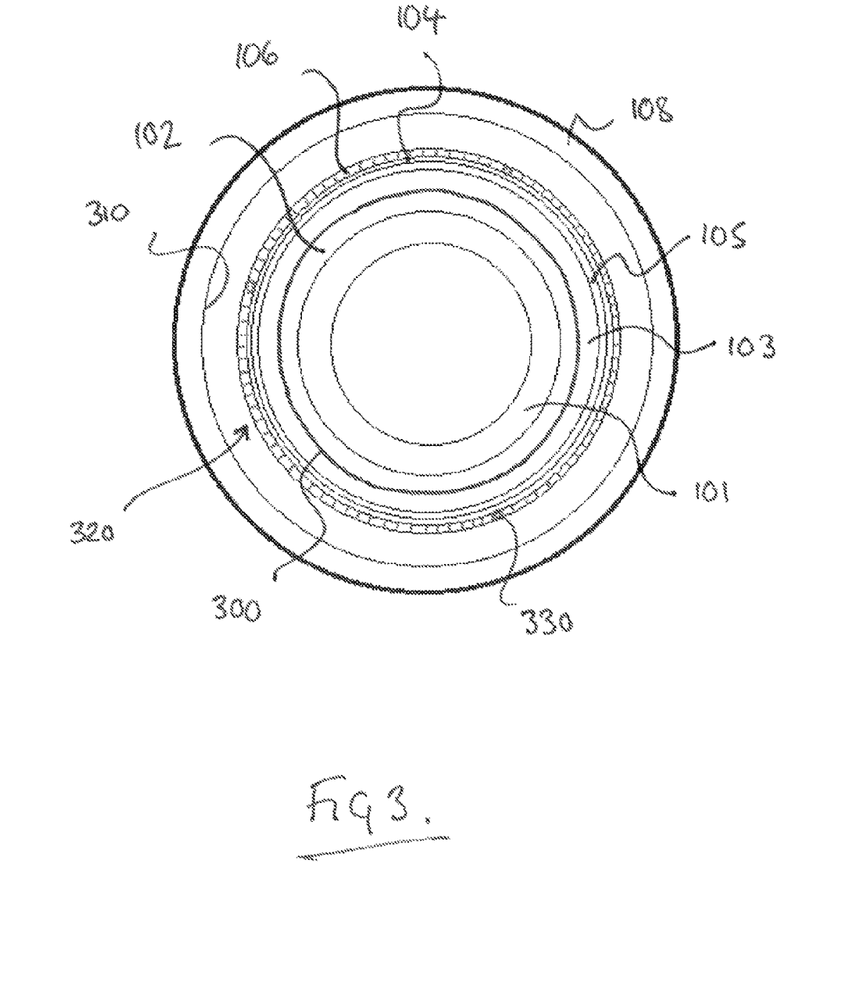
FIG. 3 illustrates a cross section through flexible pipe body.

FIG. 3 illustrates a cross sectional view through the flexible pipe body illustrated in FIG. 1 and helps illustrate how an outer surface 300 of the internal pressure sheath 102 is generally co-axial with and spaced apart from an inner surface 310 of the outer sheath 108. The outer surface 300 of the internal pressure sheath 102 and the internal surface 310 of the outer sheath are spaced apart and substantially co-axial and thus define an annulus 320 which extends along the length of the flexible pipe. The annulus 320 is an annular shaped region. It will be appreciated that certain embodiments of the present invention are applicable to flexible pipe body which includes one or more intermediate layers. The radially inner and outer surfaces of these intermediate layers are themselves spaced apart from and co-axial with other layers to define further annulus regions each of which may also be referred to as an annulus.

FIG. 3 also helps illustrate how wires in the tensile armour layer 106 extend to form a metallic layer. FIG. 3 also helps illustrate how three wires 330 can be replaced as tubes wound in a similar helical fashion to the remaining wires of the layer to provide respective fluid communicating passageways along the length of the flexible pipe body. Aptly each of the fluid communicating passageways 330 is a conduit provided, for example, by a pressure rated tube. The conduit is sufficiently crush resistant so that it is not crushed during manufacturing and so that it does not crack over an operational lifetime of the flexible pipe. Aptly the conduit is a steel tube or other metal tube or corrosion resistant alloy tube, or a crush resistant polymer composite tube. Aptly the conduit is formed from a malleable material so that it can be wound. Aptly the conduit is a copper tube. Aptly the conduit is a pressure rated steel tube. Aptly the conduit is pressure rated.

As illustrated in FIG. 3 three conduits can be provided along the length of the flexible pipe. It will be appreciated that according to certain embodiments of the present invention one, two, three, four or more conduits can be provided. These can be evenly distributed around the pipe or more closely packed at desired locations. It will also be appreciated that such fluid communication passageways can be provided in a mixture of layers such as one or more conduits in an outer tensile armour layer and one or more conduits in an inner tensile armour layer or, as illustrated in FIG. 3 all conduits can be provided in a common layer. The conduits are in fluid communication with the annulus 320 of the flexible pipe in which they are located.

Figure 4:
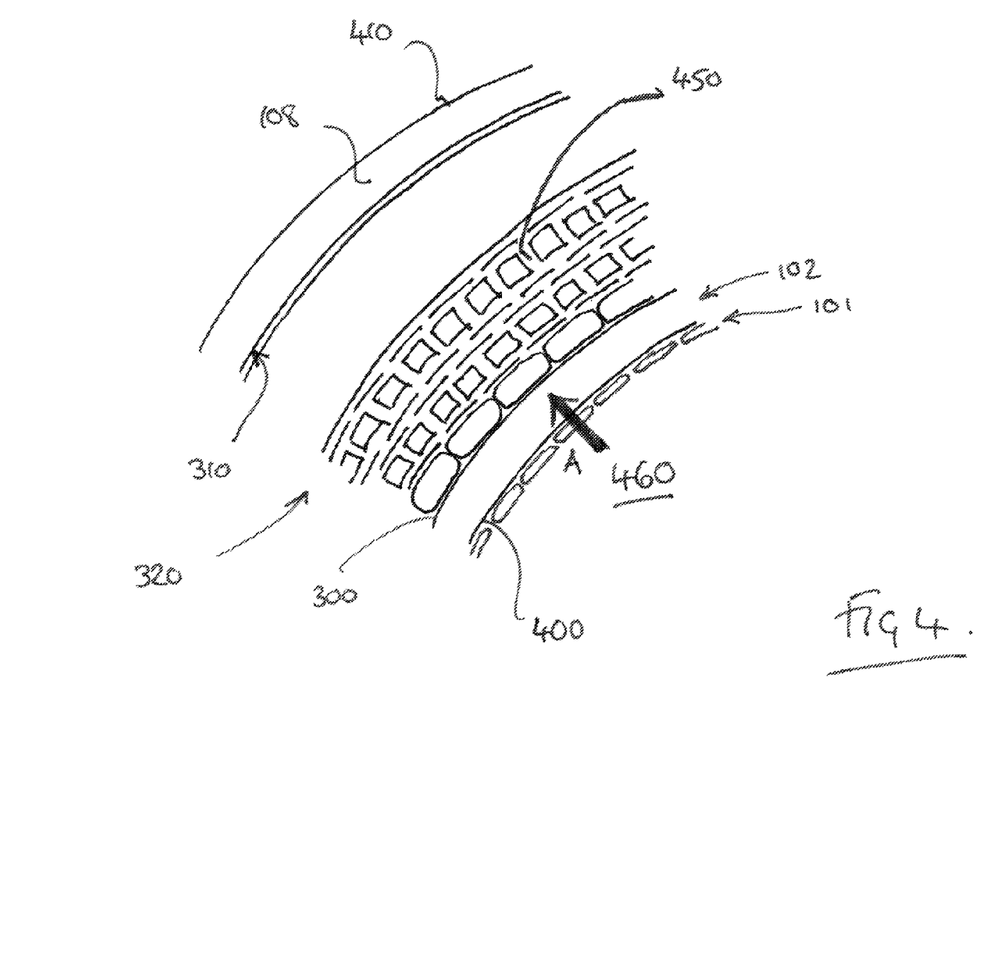
FIG. 4 illustrates a void space of an annulus.

FIG. 4 helps illustrate in a schematic format a magnified view of a portion of a cross section through the flexible pipe body illustrated in FIG. 3. The carcass layer 101 is provided by interlocking windings. The barrier layer 102 has a radially innermost surface 400 which defines an inner bore of the flexible pipe body in use. The radially outermost surface 300 of the barrier layer is also illustrated in FIG. 4. A radially outermost surface 410 of the outer sheath 108 is also illustrated in FIG. 4 as is the radially innermost surface 310 of the outer sheath 108. FIG. 4 helps illustrate how the annulus 320 defined by the spaced apart inner surface 310 of the outer sheath and outer surface 300 of the barrier layer 102 is partially filled with the other components of the flexible pipe. Nevertheless a void space 450 is defined in the annulus. The void space 450 is the volume of the annulus which remains free and is not filled with matter provided by the other component parts of the flexible pipe body. FIG. 4 helps illustrate how components of the production fluids travelling down the bore 460 will tend to permeate along the direction shown by arrow A through the barrier layer 102 in use and could otherwise collect in the void space 450 in the annulus 320 of the flexible pipe. As noted previously the collection of such permeated fluids can prove detrimental to the lifetime of the flexible pipe body if not purged from the annulus.

Figure 5:
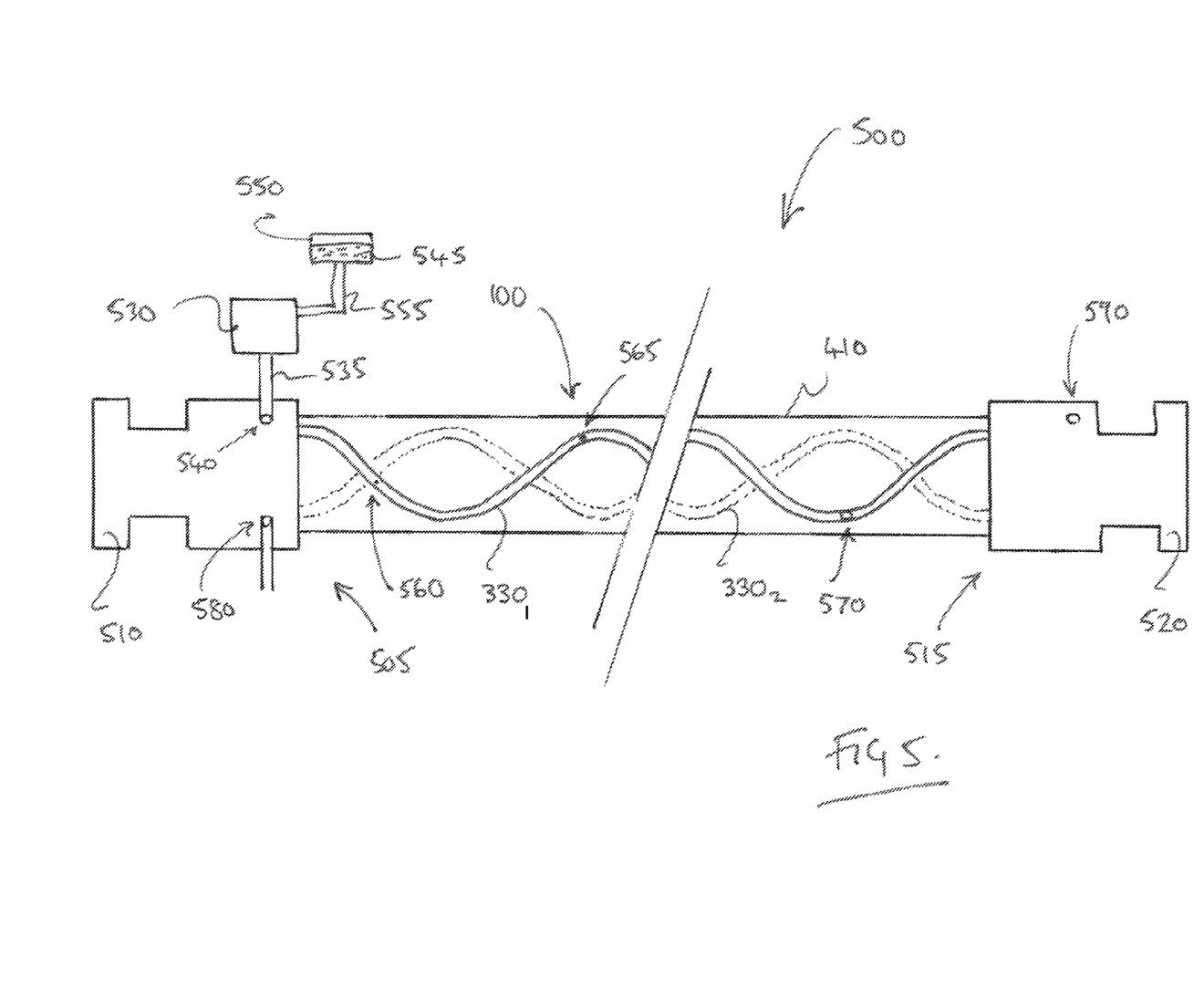
FIG. 5 illustrates schematically the introduction of a fluid to an annulus.

FIG. 5 schematically illustrates a flexible pipe 500 which includes a segment of flexible pipe body 100 having a first end 505 terminated in a first end fitting 510. The segment of flexible pipe body 100 also has a further end 515 which is likewise terminated in a respective further end fitting 520 illustrated on the right hand side of FIG. 5. FIG. 5 shows the two end fittings spaced apart by an indeterminate length which may be many tens of meters or hundreds of meters or indeed thousands of meters in length. A whole length of the flexible pipe body 100 extends between the two end fittings which terminate respective ends of a segment of a flexible pipe body.

FIG. 5 helps illustrate at least one conduit $330_1$ which extends along the whole length of the flexible pipe 500. FIG. 5 also helps illustrate how a further conduit $330_2$ (shown in dotted line) can also extend along a whole length of the flexible pipe.

The first end fitting 510 shown on the left hand side of FIG. 5 defines a fluid introduction end for the flexible pipe. A pump 530 is connected via a pipe 535 to a fluid introduction inlet port 540 in the end fitting. The introduction inlet port 540 is in fluid communication with an inlet to the passageway running through the conduit $330_1$. The pump is a positive pressure pump. That is to say the pump 530 receives a predetermined fluid 545 from a container 550 via a connecting pipe 555 and is able to supply it at a pressure greater than atmospheric pressure to a desired location. The positive pressure pump 530 provides the fluid 545 from the fluid source into the annulus at a flow rate of at least about around 5 liters per minute. Aptly the flow rate is at least about around 15 liters per minute. Aptly the flow rate is at least about around 25 liters per minute.

The fluid 545 is optionally an inert fluid. Aptly the fluid 545 is water. Aptly the fluid 545 is a gas. Aptly the fluid 545 is a grease. Aptly the fluid 545 is an oil. Aptly the fluid is dosed with at least one of an oxygen scavenger and/or a $H_2S$ scavenger and/or a PH buffer and/or a biocide and/or a corrosion inhibitor. Aptly the fluid 545 is a protective liquid which is an inert liquid which retards corrosion of metal in the annulus. Aptly the protective liquid is glycol. Aptly the liquid is monoethylene glycol (MEG). Glycols such as MEG function as dehydrating agents capturing any absorbed water and helping to prevent it from reaching the metal of the armour layer. Aptly the protective liquid is an alcohol. Aptly the protective liquid is methanol. Aptly the protective liquid is water dosed with approximately 600 ppm PRESERVAN 650 inhibitor from Clariant Oil Services, (or an equivalent). The protective liquid is an example of a sustaining fluid.

The positive pressure pump 530 is able to pump the fluid 545 from the container 550 into the inlet 540 at a pressure of less than about around 80 psi. Aptly the positive pressure pump introduces the predetermined fluid into the inlet port 540 and thus into an inlet at an end of the conduit $330_1$ at a positive pressure less than about around 50 psi. Aptly the positive pressure is less than about around 40 psi. Aptly the positive pressure is less than about around 30 psi. By introducing the predetermined fluid via the inlet port 540 into the conduit $330_1$ the introduced fluid can be communicated into the void space 450 of the annulus 320 of the flexible pipe. The introduced fluid is communicated into the void space of the annulus via openings (three shown in FIG. 5) in the wall of the conduit $330_1$. A first opening 560 is illustrated in FIG. 5 nearest to the end fitting 510 at the introduction end of the flexible pipe. A further opening 565 is shown towards the middle region of the flexible pipe and a final opening 570 is illustrated in FIG. 5 towards a remaining end of the flexible pipe. Of course any number of openings could be provided in any number of conduits according to certain embodiments of the present invention. Each opening provides an open area in the wall of the conduit. The opening is a through hole which enables fluid to be communicated from an inner lumen of the conduit to a surrounding area. The openings in the conduit are located at respective positions which are spaced apart along the length of the conduit. As a result fluid is communicated through the openings to a plurality of axially spaced apart locations along the annulus.

Figure 6:
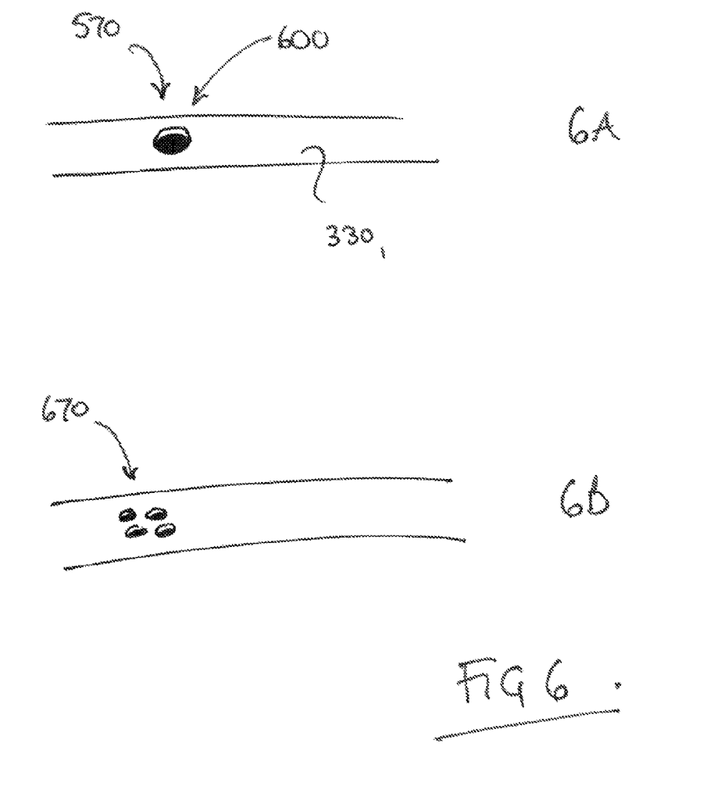
FIG. 6 illustrates a conduit having openings.

The openings 560, 565, 570 in the conduit $330_1$ shown in FIG. 5 are not the same size. That is to say the open area that each opening provides is different. The opening 560 nearest the introduction end 505 of the flexible pipe has a relatively small open area. The middle opening 565 has an increased open area whilst the opening 570 towards the end of the flexible pipe away from the introduction end has the greatest open area. This helps ensure that fluid is communicated evenly along a whole length of the flexible pipe when introduced. FIG. 6A illustrates the opening 570 in the wall of the conduit $330_1$ in more detail. The open area 600 is broadly provided by the area of a single circular shaped hole. Holes could of course have different shapes. It will be appreciated that an open area through which fluid can be communicated between a conduit and an annulus can be provided by multiple through holes at a given location rather than one large through hole. FIG. 6B illustrates how four smaller openings 670 could be provided in close proximity and the open area at that position would be the combined total of open area of all openings at that position.

Figure 7:
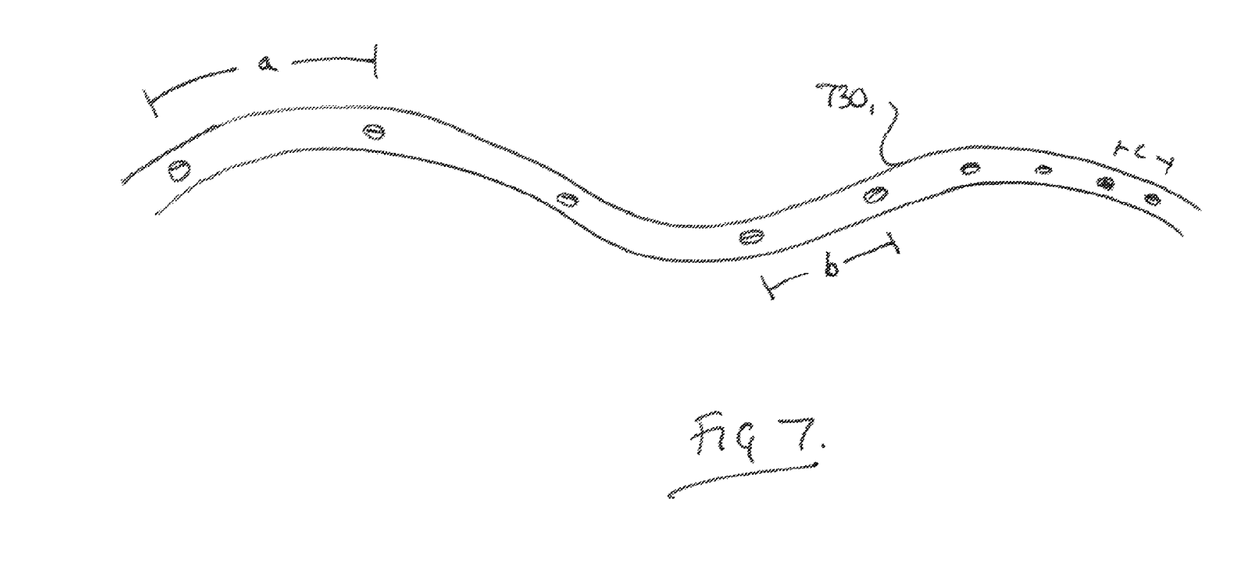
FIG. 7 illustrates openings having an increasing open area towards an end of the conduit.

FIG. 7 helps illustrate an alternative example of a conduit $730_1$ to the conduit $330_1$ shown in FIG. 5. An increasing open area in the conduit $730_1$ is provided towards an end fitting away from the fluid introduction end fitting not by changing the size of the openings in the conduit but by increasing the frequency of openings in the conduit. As illustrated in FIG. 7 a distance a between spaced apart openings at one end of the conduit is greater than a spacing b between adjacent openings towards a middle region of the conduit $730_1$ and this is itself greater than a spaced apart distance c between adjacent openings towards a remaining end of the conduit. The net effect is that there is more open area through which fluid can be communicated into an annulus away from an end at which the fluid is introduced into the fluid communicating passageway. This helps ensure even and rapid distribution of fluid along the annulus.

Thus by pumping a desired fluid into an inlet port 540 of an end fitting at a desired pressure and flow rate that fluid can be communicated into an annulus 320 of the flexible pipe via openings in one or more conduits which extend along the flexible pipe. This can be carried out optionally either to merely fill the void space with a sustaining fluid which is thereafter retained in the annulus or as described below as part of a purging process in which fluid from the annulus is urged out of the annulus.

In terms of purging the annulus, which can occur as a one off event or more frequently at selected times or with a regular frequency, fluid from the annulus is urged out of the annulus via one or more exit ports in the end fittings. FIG. 5 illustrates an exit port 580 in the introduction end end fitting 510. FIG. 5 also illustrates an exit port 590 in the remaining end fitting 520. One, two or three exit ports can be provided in only one of the end fittings or in both end fittings or just one end fitting according to certain embodiments of the present invention. Each end fitting that includes an exit port 580, 590 includes an internal fluid communication passageway which connects the exit port to the annulus of the flexible pipe.

To purge the annulus is first entirely or at least substantially filled with a predetermined fluid. This acts as a filler fluid. Once the annulus is filled with fluid any subsequent purge attempts, which are carried out by introducing new predetermined fluid as purge fluid to displace the extant fluid from the annulus, can be carried out at reduced pressures relative to conventional techniques. This is because frictional effects of the component parts within the annulus and fluid surface tensions are overcome by the existence of the in situ fluid (pressure is equal throughout a fluid). Thus by pumping in predetermined fluid via the inlet and at least one conduit in the annulus, fluid, which may include previously introduced predetermined fluid and/or permeated component, is urged out of an exit port at one or both ends of the flexible pipe.

It will be appreciated that according to certain other embodiments of the present invention the positive pressure pump 530 could additionally be activated as a negative pressure pump. Alternatively a separate positive pressure pump and a negative pressure pump may be selectively connected to the inlet port 540 via one or more valves as will be understood by those skilled in the art. In this way the positive pressure pump can be used to fill the void space in the annulus and then the annulus can be evacuated by effectively sucking fluid out via the same conduit. Alternatively once the annulus has been filled with fluid via the inlet port 540, the conduit 330₁ and the openings 560, 565 and 570, the positive pressure pump may be disconnected from port 540 and connected to port 580 in order to reverse the fluid flow previously used to fill the annulus and more effectively and efficiently urge fluid out of port 540. Alternatively as illustrated in FIG. 5 one or more conduits may be used to introduce fluid into an annulus whilst other conduits are used to remove fluid from the annulus. The introduction and removal processes can occur simultaneously or consecutively with a filling mode of operation being followed by a removal mode of operation.

Figure 8:
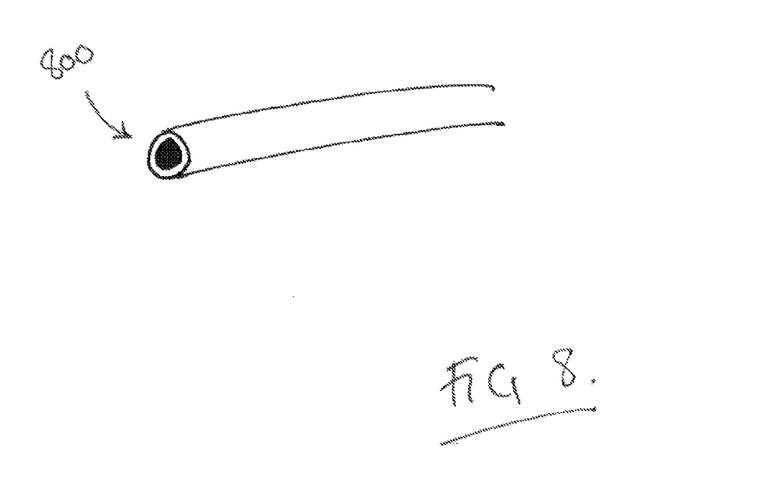
FIG. 8 illustrates an opening at an open end of a conduit.

It will be appreciated that whilst the conduits so far described as fluid communication passageways have been described as extending a whole length along the flexible pipe it is possible according to certain other embodiments of the present invention to provide multiple conduits that each extend a respective distance along only a part of the length of the flexible pipe from the introduction end fitting. Each conduit could have an open end 800 as shown in FIG. 8 which thus provides for fluid communication between an inlet end of a conduit and a remote open outlet end 800 of the same conduit and the annulus at a respective location along the length of the flexible pipe where the conduit terminates with openings as previously discussed.

Figure 9:
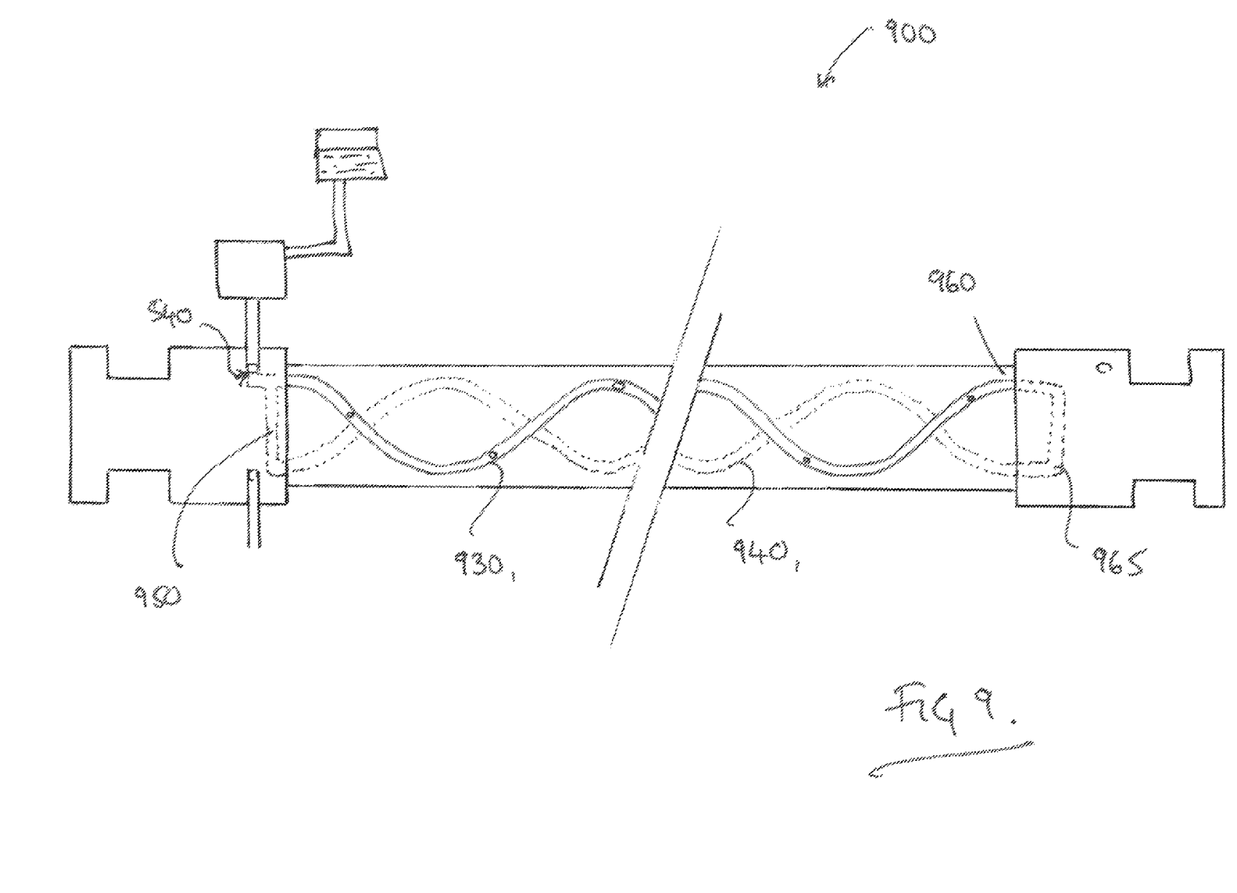
FIG. 9 illustrates an alternative technique for introducing predetermined fluid into an annulus.

FIG. 9 illustrates an alternative embodiment of the present invention which is in many respects similar to that shown in FIG. 5 however in the embodiment shown in FIG. 9 the flexible pipe 900 includes one or more fluid introducing conduits 930₁ (one shown in FIG. 9) and one or more connecting conduits 940₁. Each connecting conduit 940₁ is a sealed conduit. That is to say the conduit does not have any openings along its length. The connecting conduit 940₁ thus provides an effective fluid communication passageway between a fluid inlet passageway 950 in the first end fitting at the introduction end of the flexible pipe 900. This passageway receives fluid introduced at the inlet port 540 so that fluid is simultaneously introduced at an end of the fluid communicating conduit 930₁ as well as the sealed conduit 940₁. The sealed conduit 940₁ communicates the predetermined fluid to the remaining end fitting of the flexible pipe 900 (or a remote location along the flexible pipe) and this fluid is introduced into a far end 960 of the fluid communicating conduit 930₁ via a connecting passageway 965 in the end fitting (or directly if the connection between the sealed conduit 940₁ and the fluid communicating conduit 930₁ lies within the flexible pipe body rather than at an end fitting). This embodiment of the present invention thus enables fluid to be effectively introduced simultaneously at both ends of a conduit that extends along the length of the flexible pipe at the same time. This helps increase the fluid introduction rate into the annulus of the flexible pipe and also helps reduce the pressure needed to introduce fluid into the annulus. In this embodiment the open area of openings in the fluid communicating conduit 930₁ increase towards a middle of the conduit and begin as openings having smaller open areas. Alternatively or additionally the frequency (in terms of holes per unit length) increases away from the ends of the flexible pipe. This helps communicate fluid throughout the length of the annulus effectively.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method for providing a predetermined fluid in a void space of an annulus of a length of flexible pipe, comprising the steps of:
   introducing a predetermined fluid into at least one fluid communication passageway comprising at least one elongate conduit in the annulus of the length of flexible pipe; and
   via the passageway, communicating the fluid into the void space of the annulus via a plurality of openings in the at least one elongate conduit provided at a plurality of axially spaced apart locations and wherein the fluid is communicated at a pressure of less than about around 80 psi;
   wherein the method further comprises substantially filling the void space with the predetermined fluid; and
   wherein an open area provided by the openings decreases towards at least one end of the length of flexible pipe such that when the fluid is introduced into the void space, the fluid is communicated evenly along the length of flexible pipe.

2. The method as claimed in claim 1, further comprising: communicating fluid to said plurality of locations substantially simultaneously.

3. The method as claimed in claim 1, further comprising: providing said predetermined fluid at a flow rate of at least about around 5 liters per minute.

4. The method as claimed in claim 1 wherein the positive pressure is less than about around 50 psi.

5. The method as claimed in claim 1 wherein the positive pressure is less than about around 40 psi.

6. The method as claimed in claim 1, further comprising: wherein the openings are provided at locations spaced apart along substantially the whole length of flexible pipe.

7. The method as claimed in claim 1, further comprising: the step of introducing a fluid into a fluid communication passageway comprises selectively providing the predetermined fluid from a fluid source to an inlet at an end of the at least one elongate conduit, and wherein the at least one elongate conduit extends from a first end of the length of flexible pipe along the annulus and in fluid communication with the annulus void space; and wherein the plurality of openings are provided in a wall of the at least one elongate conduit.

8. The method as claimed in claim 1, further comprising:
urging fluid from the void space via at least one outlet, in communication with the annulus, disposed at a respective end of the length of flexible pipe.

9. The method as claimed in claim 1, further comprising:
urging fluid from the void space by substantially filling the void space with predetermined fluid introduced via the fluid communication passageway using a positive pressure and subsequently providing a negative pressure to the same fluid communication passageway thereby extracting fluid via the fluid communication passageway.

10. The method as claimed in claim 1, further comprising:
urging fluid from the void space by communicating fluid to the void space via said fluid communication passageway and removing fluid via at least one further fluid communication passageway that extends along the annulus and is in fluid communication with the annulus void space.

11. A flexible pipe, comprising:
an inner fluid retaining layer and an outer fluid retaining layer spaced apart to provide an annulus therebetween; and
at least one conduit extending along the annulus from a fluid introduction end of the flexible pipe; wherein
said at least one conduit comprises a plurality of openings disposed at respective positions along the annulus for communicating fluid introduced at an end of the conduit into a void space of the annulus at a plurality of axially spaced apart locations and at a flow rate of at least about around 5 liters per minute and at a pressure of less than about around 80 psi;

wherein an open area provided by the openings of each conduit decreases towards at least one end of the flexible pipe.

12. The flexible pipe as claimed in claim 11, further comprising:
the at least one conduit comprises one or more conduits that each extend between a first and second end fitting at respective ends of the flexible pipe.

13. The flexible pipe as claimed in claim 12, further comprising:
each of said one or more conduits comprises a plurality of openings in a wall of the conduit.

14. The flexible pipe as claimed in claim 11, further comprising:
at least one connecting conduit that extends along a length of the annulus between end fittings of the flexible pipe to provide a sealed fluid communication passageway between respective ends of each said at least one conduit.

15. The flexible pipe as claimed in claim 11, further comprising:
the at least one conduit comprises a plurality of conduits that each extend from a common end of the flexible pipe and terminate with an open end at different lengths along the annulus.

16. Apparatus for providing a predetermined fluid in a void space of an annulus of a flexible pipe comprising:
the flexible pipe as claimed in claim 11;
a source of a predetermined fluid; and
a positive pressure source for introducing the predetermined fluid into the annulus of the flexible pipe via said at least one conduit and at a pressure of less than about around 80 psi.

17. The apparatus as claimed in claim 16, further comprising:
a negative pressure pump for removing fluid from the annulus of the flexible pipe via said at least one conduit.

* * * * *